(12) United States Patent
Bolsover et al.

(10) Patent No.: US 6,619,264 B2
(45) Date of Patent: Sep. 16, 2003

(54) LOST CORE FUEL RAIL WITH ATTACHMENT FEATURES

(75) Inventors: Graham T. Bolsover, Kingsville (CA); Lisa Whaley, Wheatley (CA); Jon-David Kehoe, Belle River (CA); Ki Ho Lee, Windsor (CA)

(73) Assignee: Siemens VDO Automotive Inc., Tilbury (CA)

( * ) Notice: Subject to any disclaimer, the term of this patent is extended or adjusted under 35 U.S.C. 154(b) by 0 days.

(21) Appl. No.: 09/916,079

(22) Filed: Jul. 26, 2001

(65) Prior Publication Data

US 2002/0046736 A1 Apr. 25, 2002

Related U.S. Application Data

(60) Provisional application No. 60/243,181, filed on Oct. 25, 2000.

(51) Int. Cl.[7] ............................................. F02M 55/02
(52) U.S. Cl. .................................. 123/456; 123/470
(58) Field of Search .............................. 123/456, 470, 123/468, 469; 239/600

(56) References Cited

U.S. PATENT DOCUMENTS

| | | | |
|---|---|---|---|
| 4,295,452 A | * 10/1981 | Lembke et al. | 123/470 |
| 4,395,988 A | 8/1983 | Knapp et al. | 123/469 |
| 4,991,557 A | 2/1991 | DeGrace et al. | 123/470 |
| 5,140,963 A | 8/1992 | Brackett et al. | 123/470 |
| 5,301,647 A | 4/1994 | Lorraine | 123/470 |
| 5,394,850 A | * 3/1995 | Murphy et al. | 123/470 |
| 5,531,202 A | 7/1996 | Lorraine | 123/456 |
| 5,724,946 A | 3/1998 | Franchitto | 123/470 |
| 6,251,323 B1 | * 6/2001 | Hoedl et al. | 264/254 |

FOREIGN PATENT DOCUMENTS

DE   19739810   * 12/1998   ........ F02M/55/02

* cited by examiner

Primary Examiner—Tony M. Argenbright

(57) ABSTRACT

A fuel rail is formed by a lost core process. The core is formed of metal, and then over-molded with plastic. The plastic over-molded metal core is immersed in a hot bath of glycolitin oil. The metal core melts, leaving the plastic overmold fuel rail. Attachment features can be formed in the fuel rail to attach fuel injectors by a snap fit connection, a threaded connection, or a twist and lock connection.

14 Claims, 4 Drawing Sheets

LOST CORE FUEL RAIL WITH ATTACHMENT FEATURES

This application claims priority to provisional application Ser. No. 60/243,181 filed Oct. 25, 2000.

BACKGROUND OF THE INVENTION

The present invention relates generally to a fuel rail formed by a lost core process which is formed in one piece and includes attachment features for the attachment of fuel injectors to the fuel rail.

A fuel rail delivers fuel from the engine's fuel tank system and into an internal combustion engine. For a V-type internal combustion engine, it is common to form the fuel rail from two main fuel tubes. The fuel tubes are commonly made of metal or plastic and are either molded or are stamped and welded. The fuel tubes are connected by a metal cross-over tube which conveys fuel from one tube to the other. O-rings are used to seal the connection. The fuel rail also includes a plurality of sockets. Fuel injectors are inserted into the sockets to supply fuel to the internal combustion engine. The fuel injectors are secured to the sockets of the fuel rail by stamped metal clamps.

A drawback to the prior art fuel rail is that additional materials are needed for assembly. A cross-over tube and o-rings are needed to attach the fuel tubes, and stamped metal clamps are needed to secure the fuel injectors to the fuel tubes. These additional materials are costly and require additional time for assembly.

Hence, there is a need in the art for an improved fuel rail formed by a lost core process which is formed in one piece and includes attachment features for attachment of fuel injectors.

SUMMARY OF THE INVENTION

The present invention relates generally to a fuel rail formed by a lost core process which is formed in one piece and includes attachment features for attachment of fuel injectors.

The fuel rail of the present invention is formed by a lost core process. A metal core is formed and then over-molded with plastic. The plastic over-molded metal core is immersed in a hot bath, typically of glycolitin oil. As the melting temperature of the metal core is less than the melting temperature of the plastic overmold, the metal core melts, leaving the plastic overmold fuel rail.

As the fuel rail is formed by a lost core process, attachment features can be easily formed for attachment of fuel injectors to the fuel rail. In a first embodiment, the fuel rail includes a plurality of cylindrical sockets including an enlarged annular rim. Each fuel injector has a snap fit connector including a pair of inclined portions separated by a gap. A flat surface is formed by the inclined portions. The diameter of the flat surface is slightly larger than the inner diameter of the annular rim. When a snap-fit connector of the fuel injector is inserted into a cylindrical socket of the fuel rail, the inclined portions are slightly pressed together, eliminating the gap and reducing the diameter of the flat surface and allowing the inclined portions to pass through the annular rim. Once the inclined portions pass through the annular rim, the gap reforms, securing the fuel injector to the fuel rail.

Alternatively, a plurality of internal threads are molded on the inner surface of the cylindrical socket of the fuel rail. Each fuel injector includes a plurality of corresponding external threads which are threaded into the internal threads of the socket, securing the fuel injector to the fuel rail.

In a third embodiment, a groove is molded into the inner surface of a cylindrical socket of the fuel rail. The external surface of each of the fuel injectors includes a corresponding notch. When the fuel injector is positioned in the socket of the fuel rail, the notch engages the groove, and the fuel injector is secured in the fuel rail by a twist and lock connection.

Accordingly, the present invention provides a fuel rail formed by a lost core process which is formed in one piece and includes attachment features for attachment of fuel injectors.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
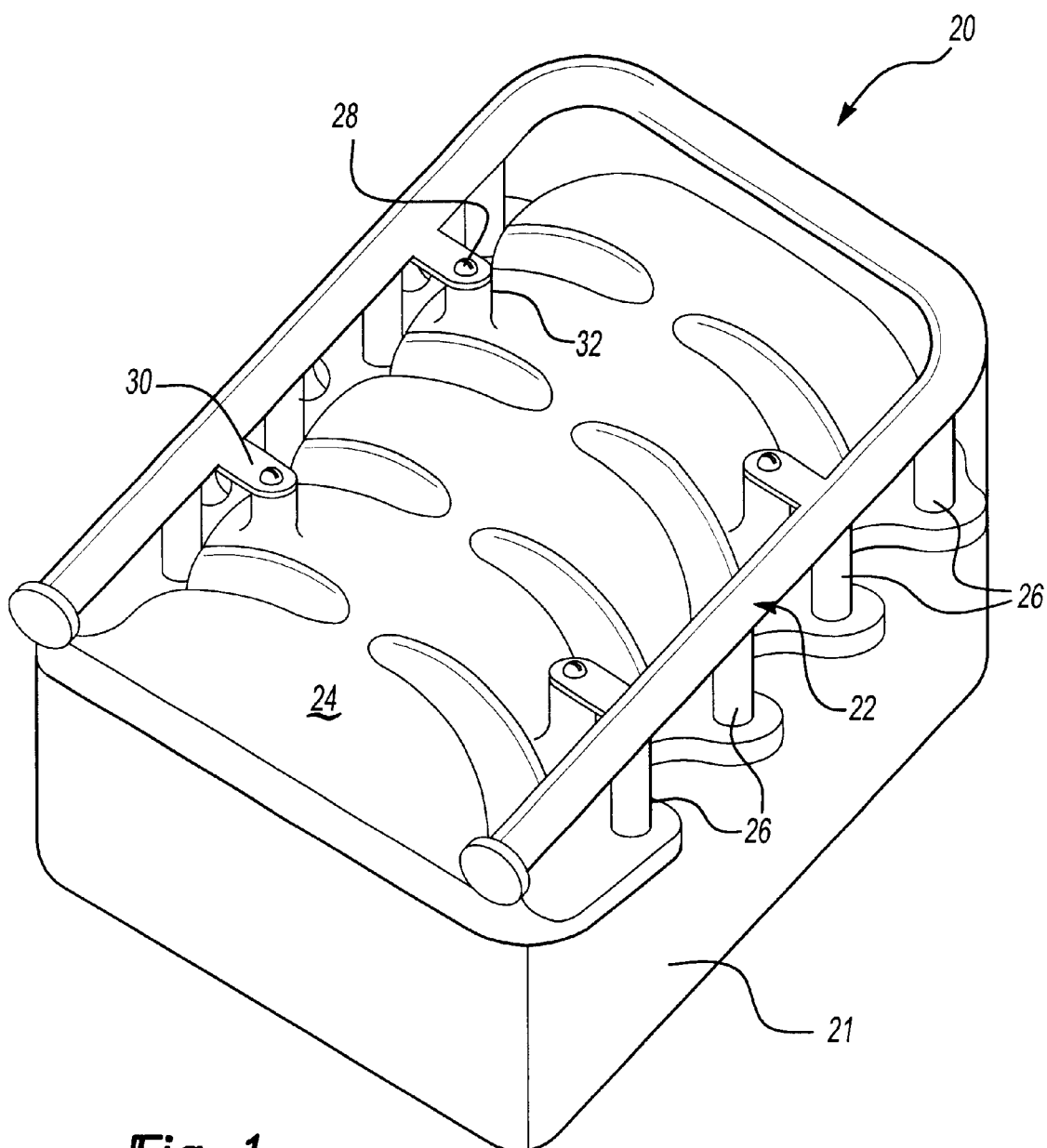
FIG. 1 illustrates a prior art fuel rail assembly.

FIG. 1 illustrates a prior art fuel rail assembly 20. The fuel rail assembly 20 includes a fuel rail 22 which is mounted to an air intake manifold 24. Fuel from the fuel rail 22 are injected by fuel injectors 26 into cylinders of the internal combustion engine 21. In the prior art fuel rail 22, the fuel rail 22 is formed of metal and is either molded or stamped and welded. The fuel rail 22 is secured to the air intake manifold 24 by screws 28 which pass through tabs 30 on the fuel rail 22. The screws 28 are received in posts 32 on the air intake manifold 24, securing the fuel rail 22 to the air intake manifold 24.

Figure 2:
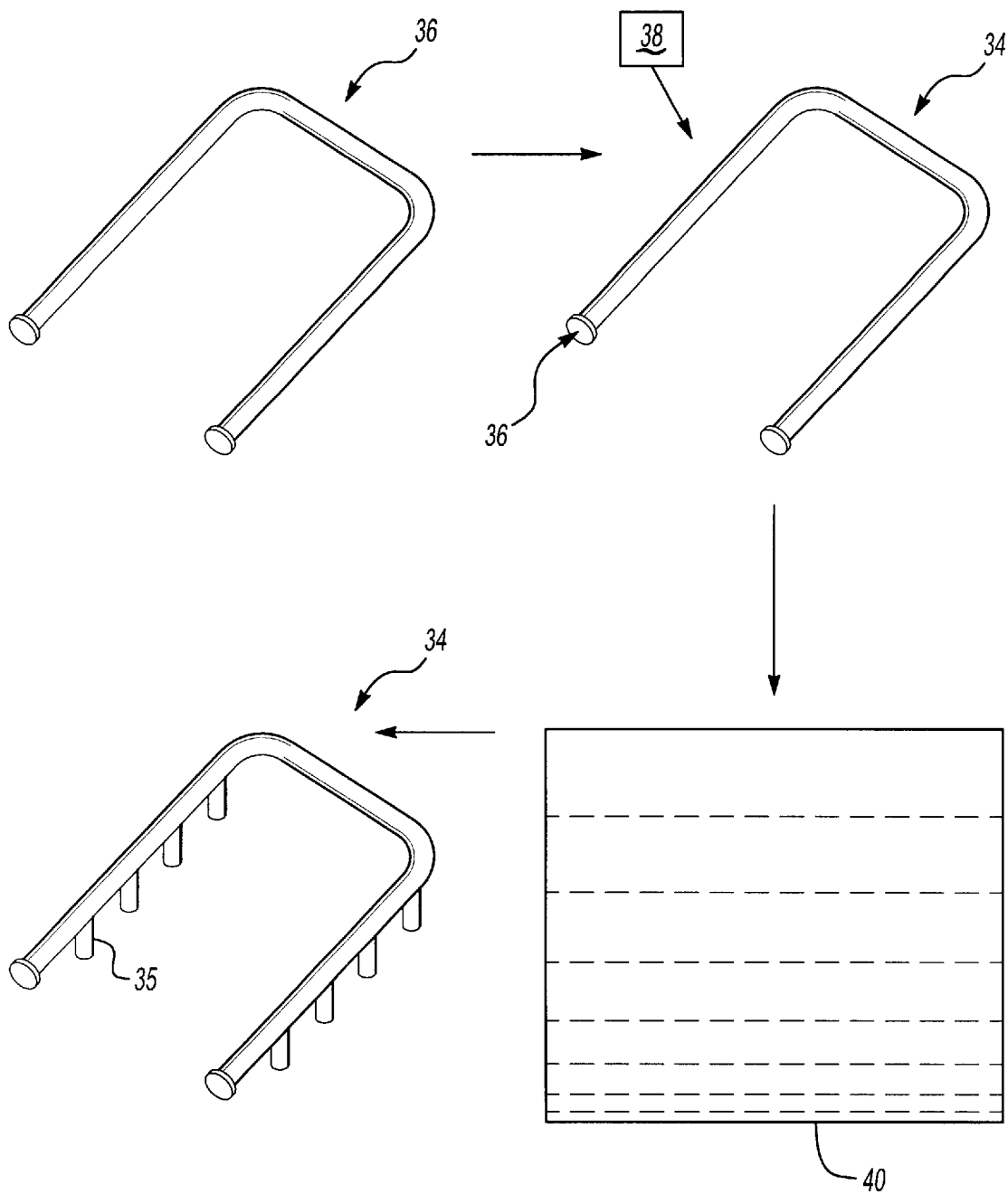
FIG. 2 illustrates a lost core process used to form a fuel rail.

The fuel rail 34 of the present invention is formed by a lost core process. As illustrated in FIG. 2, a core 36 is first formed of metal, and then over-molded with plastic by a plastic injector 38 to form a plastic overmold fuel rail 34. The over-molded metal core 36 is then immersed in a hot bath 40, typically of glycolitin oil. As the melting temperature of the metal core 36 is less than the melting temperature of the plastic overmold fuel rail 24, the metal core 36 melts, leaving the plastic overmold fuel rail 34 which is capable of handling pressurized liquid fuel. As the fuel rail 34 is molded by a lost core process, attachment features 35, such as sockets, can be molded into the fuel rail 34 to provide for attachment of fuel injectors 26 to the fuel rail 34.

Figure 3A:
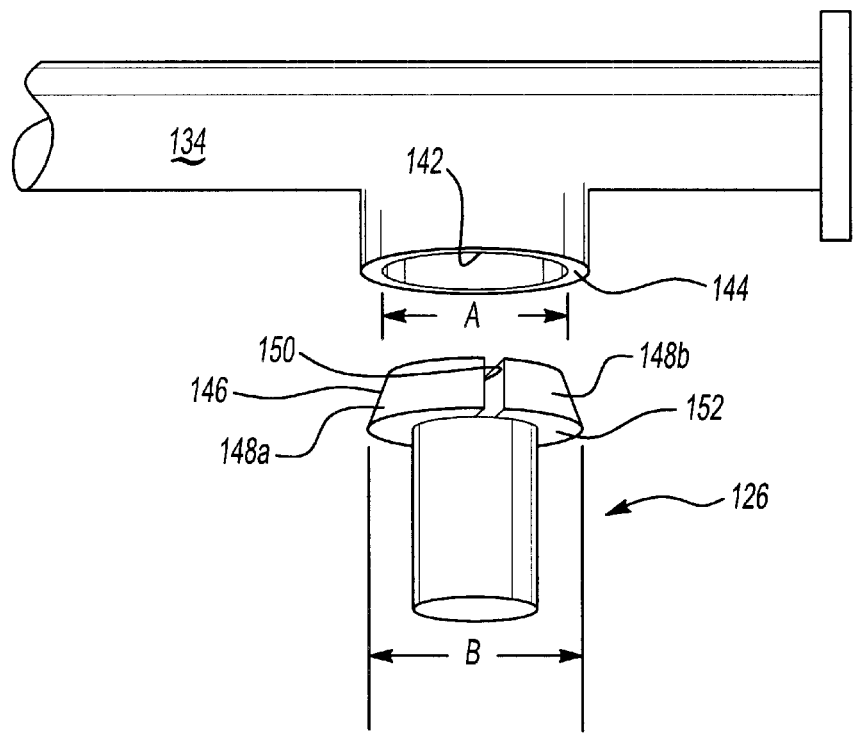
FIG. 3A illustrates a snap fit connection to connect a fuel injector to the fuel rail.

FIG. 3A illustrates a fuel injector 126 attached to a fuel rail 134 by a snap fit connection. The fuel rail 134 includes a socket 142 with an annular rim 144 having an inner diameter A. The fuel injector 126 includes a snap fit connector 146 having pair of inclined portions 148A and 148B separated by a gap 150. A flat surface 152 is formed by the inclined portion 148A and 148B and has a non-flexed diameter B which is slightly larger than diameter A of the socket 142.

Figure 3B:
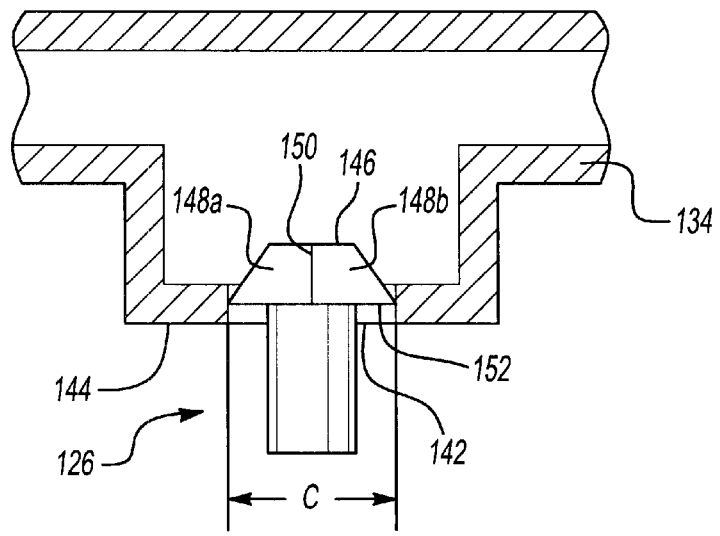
FIG. 3B illustrates the snap fit connector in a flexed position.

As shown in FIG. 3B, when the snap fit connector 146 is inserted into the socket 142, the inclined portions 148A and 148B press together, eliminating gap 150. The flat surface 152 has a flexed diameter C, which is less than diameter A of the socket 142, and the flat surface 152 is able to pass through the annular rim 144. Once the inclined portions 148A and 148B pass through the annular rim 144, the inclined portions 148A and 148B separate, expanding gap 150. The gap 150 reforms and the flat surface 152 returns to having diameter B. As diameter B of the flat surface 152 is slightly larger than the diameter A of the annular rim 144, the inclined portions 148A and 148B of the snap fit connector 146 are secured in the socket 142, securing the fuel injectors 126 to the fuel rail 134.

Figure 4:
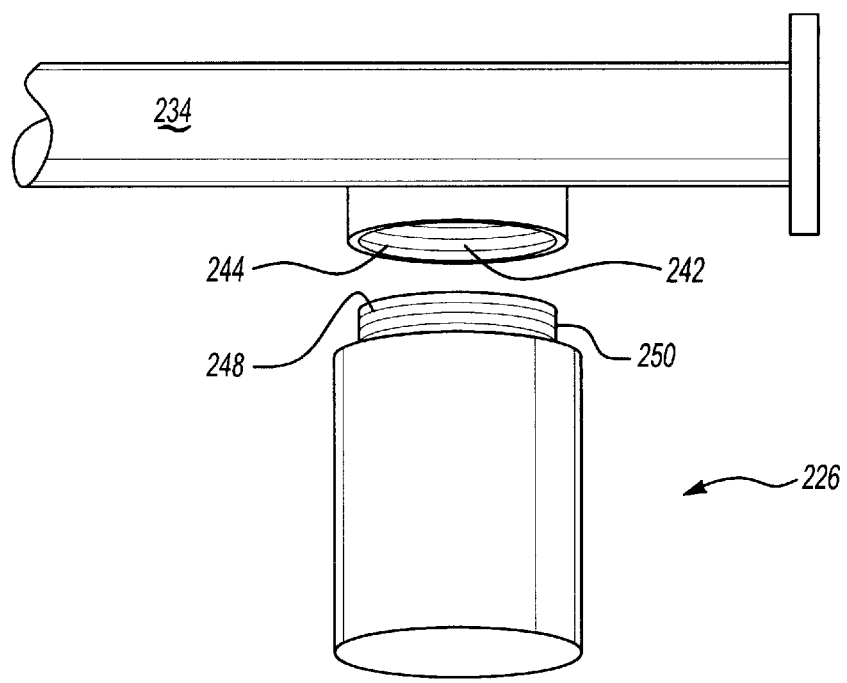
FIG. 4 illustrates a threaded connection to connect a fuel injector to the fuel rail.

FIG. 4 illustrates a second embodiment of the fuel rail 234. The fuel rail 234 includes a plurality of sockets 242 each including a plurality of internal threads 244. Each fuel injector 226 includes a threaded portion 250 including a plurality of external threads 248. The external threads 248 of each fuel injectors 226 are threaded into the internal threads 244 of the sockets 242, securing the fuel injector 226 to the fuel rail 234.

Figure 5:
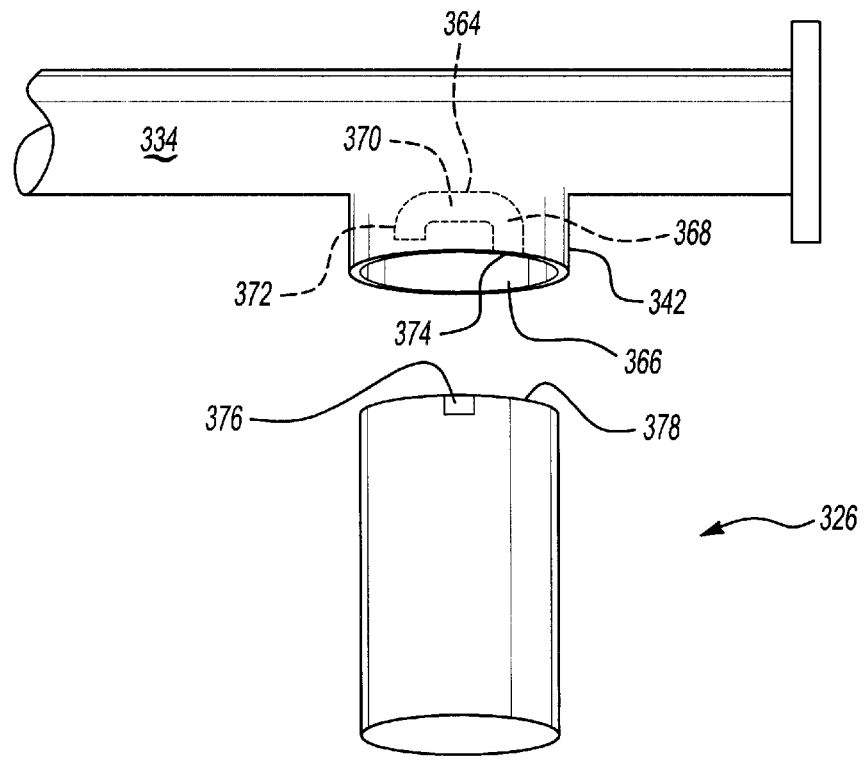
FIG. 5 illustrates a twist lock connection to connect a fuel injector to the fuel rail.

FIG. 5 illustrates a third embodiment of the fuel rail 334 using a twist and lock attachment feature. In this embodiment, the fuel rail 334 includes a plurality of sockets 342 each having a groove 364 on the interior surface 366. The groove 364 is substantially u-shaped and preferably includes a vertical portion 368, a perpendicular horizontal portion 370, and a locking vertical portion 372. The vertical portion 372 extends from the lower edge 374 of the socket 342.

A notch 376 is positioned on the fuel injector 326 proximate to the upper surface 378 of the fuel injector 326. When the fuel injector 326 is inserted into the fuel rail 334, the notch 376 inserts into the vertical portion 368 of the groove 364 at the lower edge 374. When the notch 376 has completed passing through the vertical portion 368 of the groove 364, the notch 376 then travels horizontally through the horizontal portion 370. The notch 376 then travels downwardly into the locking vertical portion 372. In this position, the fuel injector 326 is secured to the fuel rail 334. Alternatively, the notch 376 is on the socket 362, and the groove 364 is on the fuel injector 326.

There are several advantages to the lost core fuel rail of the present invention. For one, the fuel rail 34, 134, 234, 334 can be easily formed and does not have to be welded as in prior art. The fuel rail can be formed in one piece and does not require a metal cross-over tube or O-rings. Fewer parts are needed, saving money as well as assembly time. Additionally, attachment features can be easily molded into the fuel rail for attachment of fuel injectors 26, 126, 226, 326.

Accordingly, the present invention provides a fuel rail formed by a lost core process which is formed in one piece and includes attachment features for attachment of fuel injectors.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A fuel assembly comprising:
   a plastic fuel conduit fanned by a lost core molding process including at least one opening having an inner dimension; and
   at least one fuel injector including an attachment feature having a non-flexed dimension greater than said inner dimension and a flexed dimension smaller than said inner dimension, said attachment feature of said at least one fuel injector being secured in one of said at least one opening.

2. The fuel assembly as recited in claim 1 wherein said attachment feature has said flexed dimension when said at least one attachment feature is being inserted into said opening, and said at least one attachment feature has said non-flexed dimension after said at least one attachment feature is inserted into said at least one opening.

3. The fuel assembly as recited in claim 1 further including an engine component, and said fuel conduit provides fuel to said engine component.

4. A fuel assembly comprising: a fuel conduit formed by a lost core molding process including at least one opening; and
   at least one fuel injector secured in one of said at least one opening, said at least one fuel injector including a notch which engages a groove on a wall of said at least one opening, and wherein said groove is substantially u-shaped and includes a first portion extending from a lower edge of said opening, a second portion extending substantially perpendicularly to said first portion, and a third portion extending substantially parallel to said first portion, said notch being received in said third portion of said groove to secure said at least one fuel injector to one of said, at least one opening of said fuel conduit.

5. The fuel assembly as recited in claim 4 further including an engine component and said fuel conduit provides fuel to said engine component.

6. A method for forming a fuel assembly by a lost core molding process comprising the steps of;
   forming an inner core made of metal;
   overmolding said metal core with a plastic overcoat;
   melting said inner metal core;
   forming at least one opening having an inner dimension in said plastic overcoat to receive a fuel injector having an attachment feature; and
   attaching said fuel injector to said at least one opening, said attachment feature having a non-flexed dimension greater than said inner dimension and having a flexed dimension during the step of attaching smaller than said inner dimension.

7. The method as recited in claim 6 wherein the step of melting said metal core includes placing said metal core and said overcoat in glycolitin oil.

8. A fuel assembly comprising:
   a fuel conduit formed by a lost core molding process including at least one opening and a plurality of internal threads on a wall of said at least one opening; and at least one fuel injector including a plurality of external threads, said at least one fuel injector being secured in one of said at least one opening by engagement of said plurality of external threads with said plurality of internal treads.

9. A The fuel assembly as recited in claim 8 further including an engine component, and said fuel conduit provides fuel to said engine component.

10. A fuel assembly comprising:

a fuel conduit formed by a lost core molding process including at least one opening; and at least one fuel injector secured in one of said at least one opening, said at least one fuel injector including a groove which engages a notch on a wall of said at least one opening.

11. A method for forming a fuel assembly by a lost core molding process comprising the steps of:

forming an inner core made of metal;

overmolding said metal core with a plastic overcoat; and melting said inner metal core;

forming at least one opening in said plastic overcoat in receive a fuel injector;

providing a substantially u-shaped groove in a wall of said opening, said groove including a first portion extending from a lower edge of said opening, a second portion extending substantially perpendicularly to said first portion, and a third portion extending substantially parallel to said first portion, and a notch on said fuel injector, attaching said fuel injector to said at least one opening by receiving said notch of said fuel injector in said third portion of said groove of said at least one opening.

12. The method as recited in claim 11 wherein the step of melting said metal core includes placing said metal core and said overcoat in glycolitin oil.

13. A method for forming a fuel assembly by a lost core molding process comprising the steps of:

forming an inner core made of metal;

overmolding said metal core with a plastic overcoat; and melting said inner metal core;

forming at least one opening in said plastic overcoat having a plurality of external threads;

attaching a fuel injector having a plurality of internal threads to said at least one opening by engagement of said plurality of external threads with said plurality of internal threads.

14. The method as recited in claim 13 wherein the step of melting said metal core includes placing said metal core and said overcoat in glycolitin oil.

* * * * *